Oct. 4, 1932.  E. J. VON HENKE  1,880,535
WELDING MACHINE
Filed May 24, 1929 4 Sheets-Sheet 2

Oct. 4, 1932.  E. J. VON HENKE  1,880,535
WELDING MACHINE
Filed May 24, 1929  4 Sheets-Sheet 3

INVENTOR
Edmund J. von Henke
BY
Gifford, Scull & Burgess
ATTORNEYS

Oct. 4, 1932.  E. J. VON HENKE  1,880,535
WELDING MACHINE
Filed May 24, 1929    4 Sheets-Sheet 4
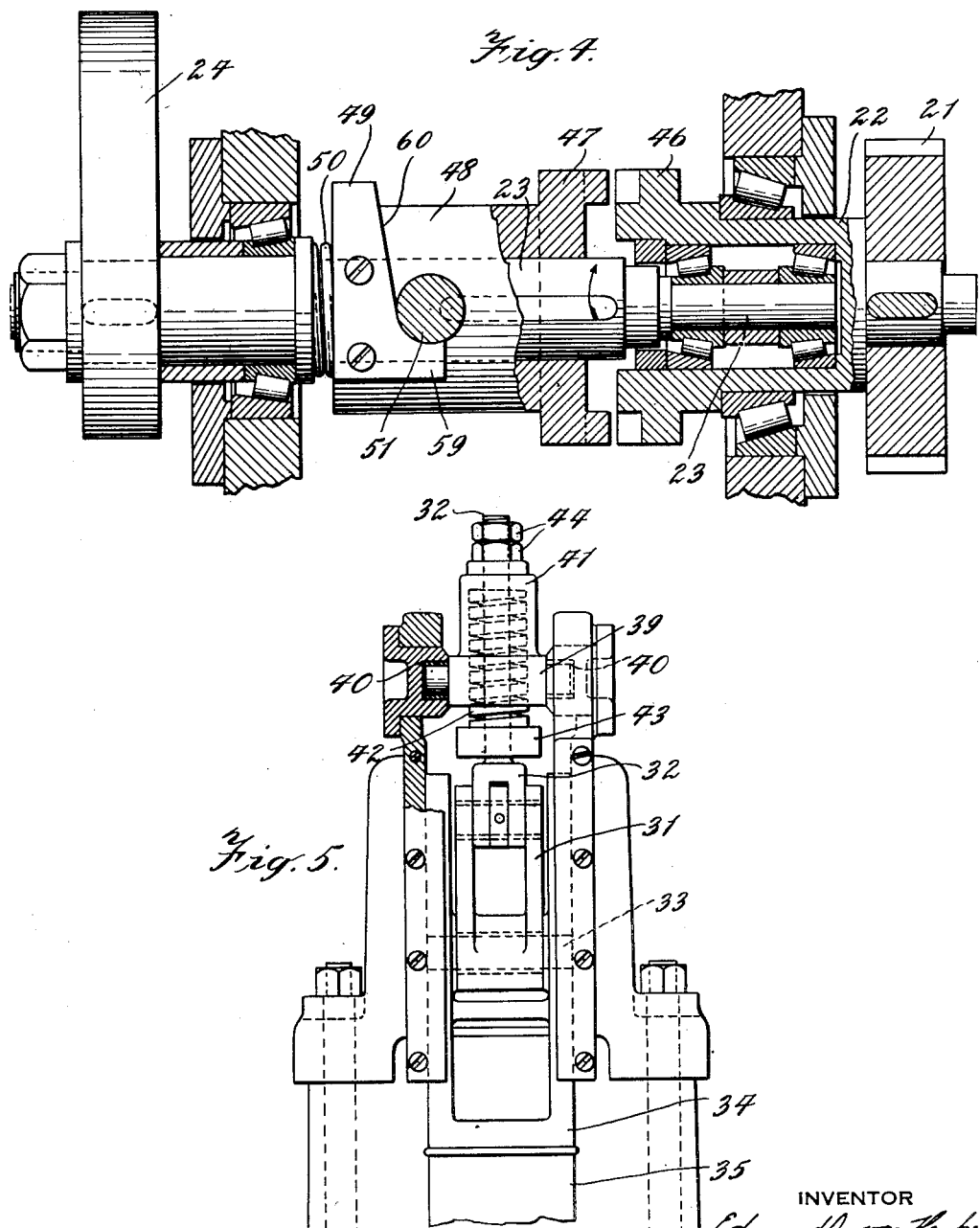
INVENTOR
Edmund J. von Henke
BY
Gifford, Scull & Burgess
ATTORNEYS Patented Oct. 4, 1932

1,880,535

UNITED STATES PATENT OFFICE

EDMUND J. VON HENKE, OF CHICAGO, ILLINOIS, ASSIGNOR TO AMERICAN ELECTRIC FUSION CORPORATION, OF CHICAGO, ILLINOIS, A CORPORATION OF ILLINOIS

WELDING MACHINE

Application filed May 24, 1929. Serial No. 365,602.

This invention relates to a novel and improved welding machine, the novel features of which will be understood from the following description and the annexed drawings in which I have shown a selected embodiment of the invention and in which:

Fig. 4 is a section taken approximately on the line 4—4 of Fig. 3.

Fig. 5 is a view partly in elevation and partly in section of the toggle mechanism shown in Fig. 1, this view being taken from the right of Fig. 1.

Fig. 6 is a view taken from the right of Fig. 1 and showing the means for holding and adjusting one of the electrodes.

Fig. 7 is a bottom plan view of the structure appearing in Fig. 6.

Fig. 8 is a section on the line 8—8 of Fig. 6.

Figure 1:
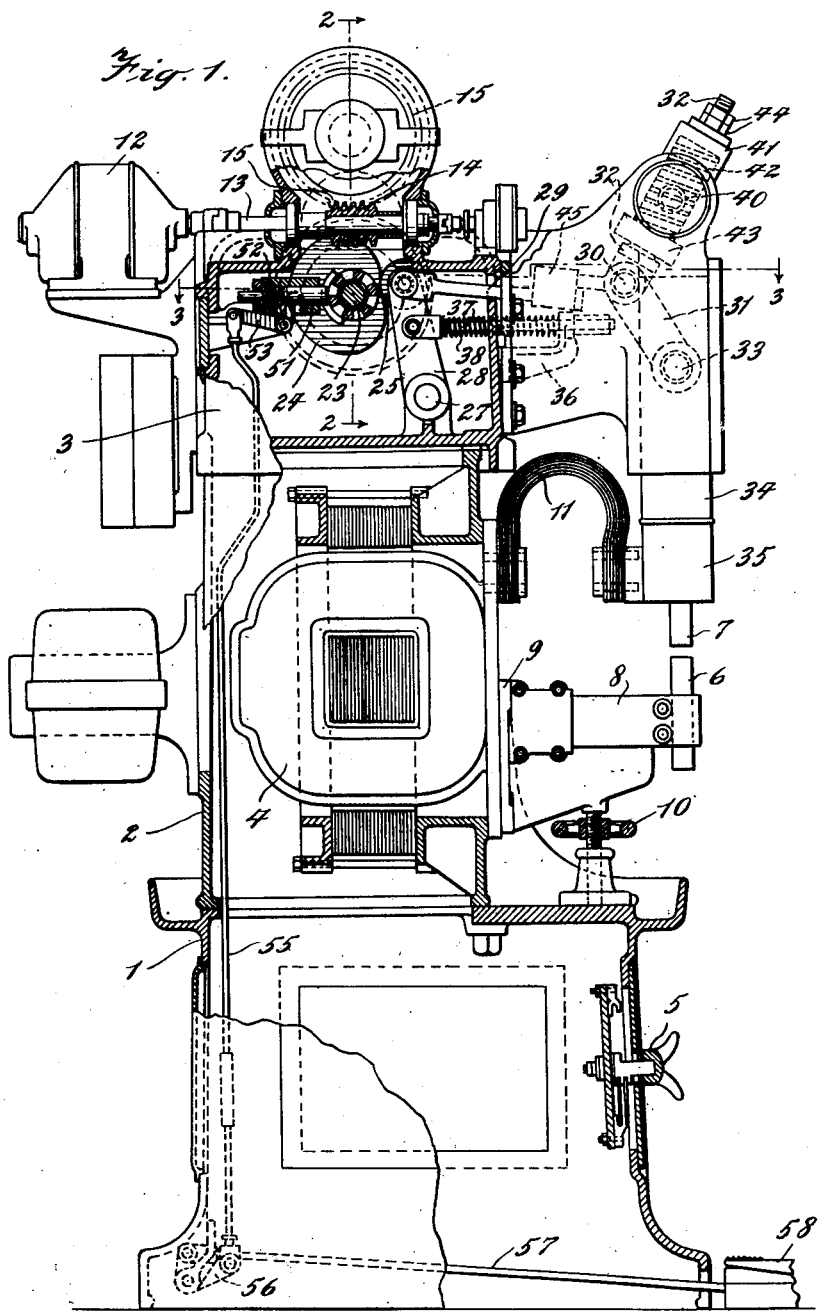
Fig. 1 is a vertical sectional view through a machine constructed according to the invention, parts being shown in elevation.

Referring first to Fig. 1, the machine comprises three units, a base unit 1, a transformer unit 2, and a top unit 3. In the base unit may be placed any suitable controlling mechanism for the transformer 4 in the unit 2. There is indicated at 5 part of such a controlling means.

Connected to the transformer 4 is a pair of electrodes 6 and 7, the electrode 6 being shown as mounted on a bracket 8 slidably supported in a guide 9 in which it is adjusted as by means of a hand screw 10. The electrode 7 is reciprocable towards and from the electrode 6, being connected to the transformer by the flexible conductor 11.

Figure 2:
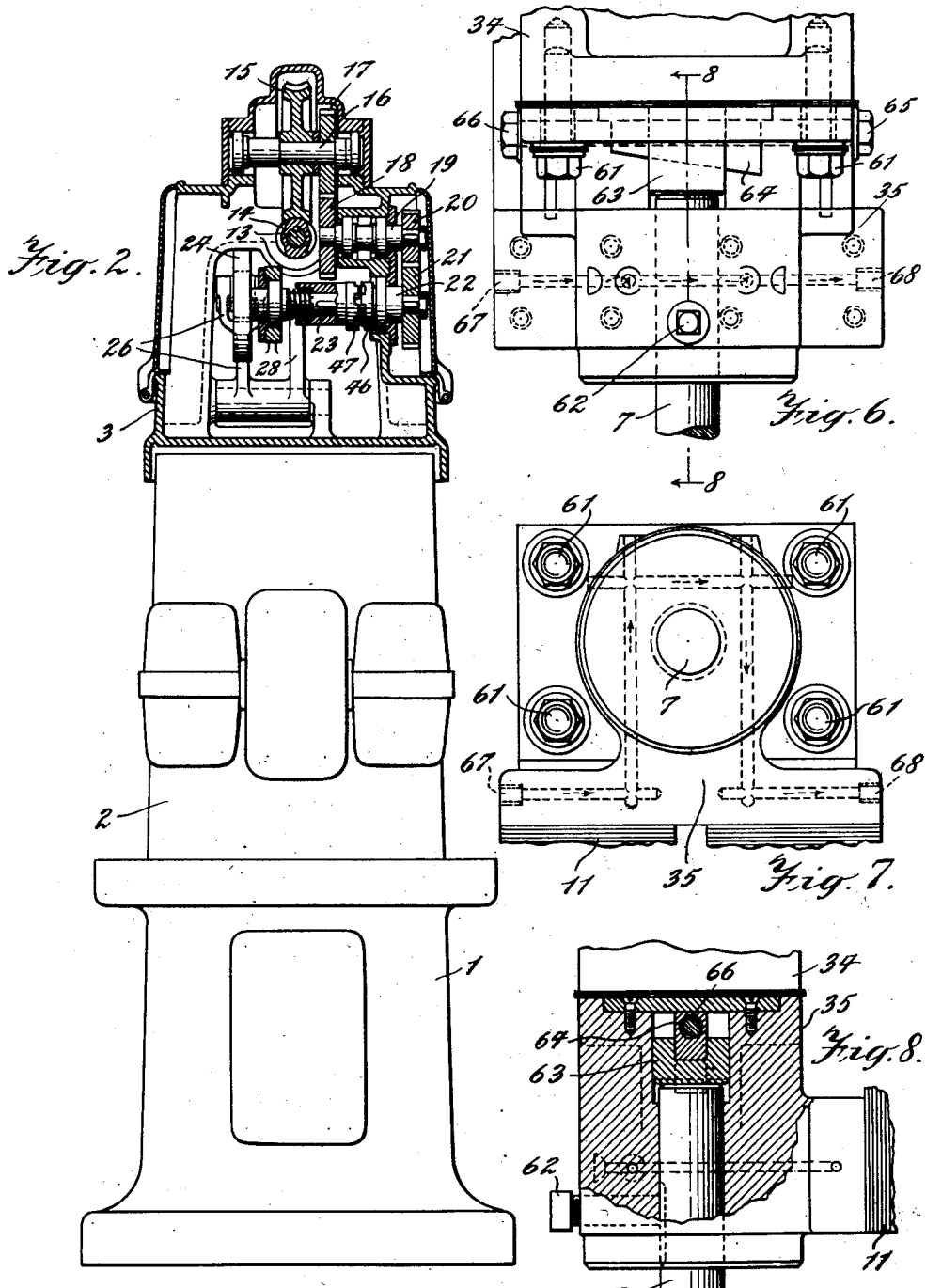
Fig. 2 is a view taken from the left of Fig. 1 but showing the top unit and its contents in section, this section being taken approximately on the line 2—2 of Fig. 1.

The top unit 3 is used to contain and support the means for operating the electrode 7, and this means will now be described. Suitably supported on the unit 3 is a motor 12 connected to a shaft 13 having thereon a worm 14 driving a worm gear 15 which is mounted on a shaft 16, as best shown in Fig. 2. This shaft has secured thereto a gear 17 meshing with a gear 18 on a shaft 19. This shaft carries a pinion 20 meshing with a gear 21 on a shaft 22.

As best shown in Fig. 4, the shaft 22 is hollow and forms a bearing for a shaft 23 rotatably mounted therein. This shaft carries a cam 24 which contacts with a cam roller 25 mounted on a rocker arm 26. This rocker arm is journaled on a pivot 27 and forms part of a rocker which includes another arm 28 to which is pivoted a link 29 connected at its other end with a joint 30 of a toggle. This toggle comprises two arms 31 and 32. The arm 31 is pivoted at its other end at 33 to the head 34 for the electrode 7, the electrode being secured to this head by means of a holder 35 which will be described more in detail later.

In order to hold the cam roller 25 in contact with the cam 24, a suitable bracket 36 is mounted on the front of the unit 3, and sliding through a bearing in this bracket is a rod 37 surrounded by a compression spring 38, this spring contacting at one end with the bearing on the bracket and on the other end with an enlargement on the rod. The rod is connected to the arm 28 and therefore the spring normally holds the arm to the left, as viewed in Fig. 1, and in which position the cam roller will be in contact with the cam.

Referring now particularly to Figs. 1 and 5, it will be seen that the arm 32 is slidably mounted in a bearing 39 which rotates on a stationary pivot 40. The bearing has integral therewith a cup 41 within which is received a compression spring 42, this spring bearing against the bottom of the cup and against an abutment 43 which is threaded on the arm 32. By this means the pressure exerted by the toggle is always a resilient one, and the amount of the pressure may be regulated by adjustment of the abutment 43.

The initial effective length of the arm 32 may be adjusted by adjustment of the nuts 44 on the threaded end of the arm. By loosening these nuts the spring will move the arm downwardly, as viewed in Figs. 1 and 5, and therefore lengthen the distance between the joint 30 and the pivot 40, this of course increasing the effective length of the arm. This adjustment is usually made as an initial one, and then the spring pressure can be varied by adjustment of the abutment 43.

Figure 3:
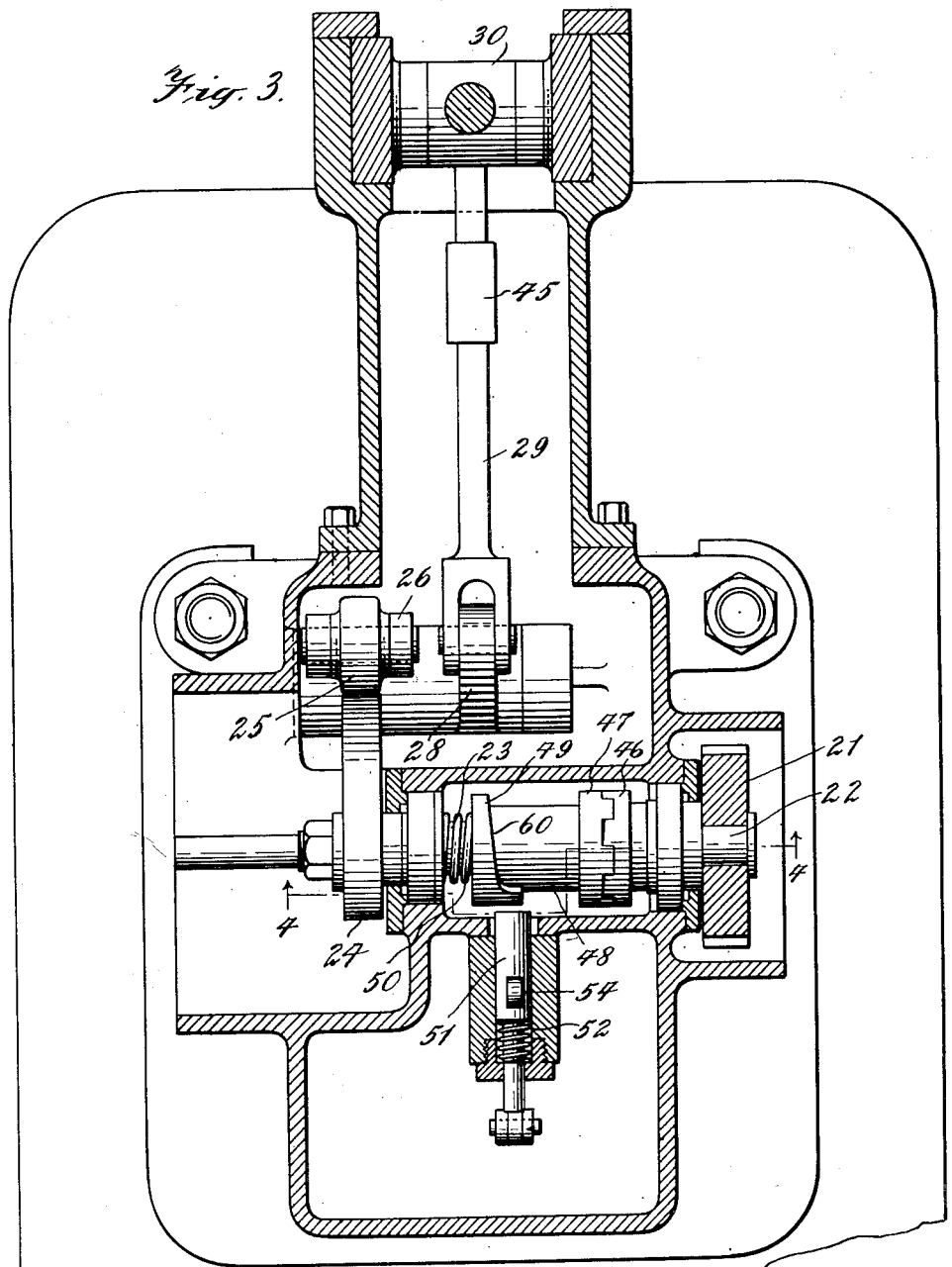
Fig. 3 is a horizontal section on an enlarged scale, taken approximately on the line 3—3 of Fig. 1.

The effective length of the link 29 may be varied by means of a suitable adjusting member 45 indicated diagrammatically in Figs. 1 and 3.

As will be seen from the above description, the shaft 22 will be continually rotating so long as current is supplied to the motor 12, that is, during normal operations the shaft 22 will be continually in motion, and normally the shaft 23 will be stationary. It is maintained stationary by the following means.

Secured to the shaft 22 is a clutch element 46 which is adapted to cooperate with a mating clutch element 47 on the shaft 23. These clutch elements are normally held out of engagement as indicated in Figs. 2 and 4. The element 47 is fastened on a sleeve 48 which is splined upon the shaft 23, and this sleeve has thereon a cam 49 which may be of the form indicated in Figs. 3 and 4. The entire sleeve and consequently the clutch element is urged towards the right as viewed in these figures, by means of a compression spring 50, but movement of the sleeve is resisted by means of a pin 51 slidably mounted to move towards and away from the sleeve 48 and normally urged towards the sleeve by means of a spring 52. When the pin is moved away from the sleeve to the position shown in Fig. 3, the spring 50 will cause the engagement of the clutch elements, as plainly shown in that figure. This movement of the pin may be caused by the mechanism indicated in Fig. 1, this mechanism comprising a bell-crank lever 53 having one end 54 received in a slot in the pin and the other end pivoted to a vertically extending rod 55. This rod is connected at its lower end to a second bell-crank lever 56 which in turn is connected to a link 57 extending to the front of the machine, and which may be moved towards the right in Fig. 1 by any suitable means operated by a treadle 58.

In operation, the shaft 22 will be continually rotating, as noted above, and ordinarily the pin 51 will hold the clutch elements 46 and 47 out of engagement. When the parts are in this position, the electrode 7 is also in the position shown in Fig. 1, that is, spaced from the electrode 6. The work to be welded is placed between the electrodes and then the workman presses down on the treadle 58 which will cause movement of the pin 51 out of engagement with the cam 49. As soon as the pin is released the spring 50 will force the element 47 into engagement with the element 46. Motion will then be imparted to the shaft 23 and consequently the cam 24 which will operate the toggle to bring the arms thereof towards their straightened position. The operation of the toggle causes downward movement of the electrode 7.

The cam 24 is of such shape and size as to cause the electrode 7 to be held in engagement with the work disposed between it and the electrode 6 for a sufficient length of time to perform the welding operation. The treadle 58 may be released as soon as the clutch elements are in engagement, the end of the pin then contacting with the portion 59 of the cam 49. The face 60 of the cam is of such shape as to come in contact with the pin 51 during continued rotation of the shaft 23, and the pin will gradually force the sleeve 48 to the left as viewed in Fig. 4 until the clutch elements are disengaged, the normal rotation of the shaft 23 being clockwise, as viewed in Fig. 1, and in the direction of the arrow shown in Fig. 4. By the time the cam and pin have reached the position shown in Fig. 4, the clutch elements will be entirely disengaged.

Referring now to Figs. 6, 7 and 8, I have shown therein the means by which the electrode 7 may be supported and adjusted. The holder 35 may be secured to the head 34 as by bolts 61. The electrode is received in a bore in the holder, in which it is held in position by a set screw 62. Between the upper end of the electrode and the head 34 are placed blocks 63 and 64, these blocks having wedge faces engaging each other and the block 64 being adjustable by means of screws 65 and 66 which have threaded engagement with opposite ends of this block, as plainly seen in Fig. 6. By this means an accurate adjustment of the electrode may be obtained and then it may be clamped in position by the set screw 62.

Suitable means are also provided for cooling the electrode, this means being exemplified by a plurality of bores surrounding the electrode. As best shown in Fig. 7, cooling fluid may be admitted at 67 and circulated in the manner indicated by the arrows through various bores, leaving at the outlet 68.

I claim:—

1. In a welding machine, an electrode reciprocable towards and away from the work, a toggle adapted to actuate said electrode and comprising two arms jointed together, a pivoted connection between one of said arms and said electrode, means to operate said toggle, means to yieldingly urge one of said arms towards said joint, and means to regulate the force exerted by said yielding means.

2. In a welding machine, an electrode reciprocable towards and away from the work, a toggle adapted to actuate said electrode and comprising two arms jointed together, a pivoted connection between one of said arms and said electrode, a rotatable bearing for the other arm, means to vary the distance from said joint to said bearing, and means to act on said joint to operate the toggle.

3. In a welding machine, an electrode reciprocable towards and away from the work, a toggle adapted to actuate said electrode and comprising two arms jointed together, a pivoted connection between one of said arms and said electrode, a rotatable bearing for the other arm, means to vary the distance from said joint to said bearing, means to act on said joint to operate the toggle, and means to regulate the force exerted between said bearing and joint.

4. In a welding machine, an electrode movable towards and away from the work, a toggle adapted to operate said electrode and comprising two arms jointed together, a pivoted connection between one of said arms and said electrode, an operating link pivoted to said arms at their joint, and means yieldably urging one of said arms towards said joint.

5. In a welding machine, an electrode movable towards and away from the work, a toggle adapted to operate said electrode and comprising two arms jointed together, a pivoted connection between one of said arms and said electrode, an operating link pivoted to said arms at their joint, means yieldably urging one of said arms towards said joint, and means to regulate the force exerted by said yieldable means.

6. In a welding machine, an electrode movable towards and away from the work, a toggle adapted to operate said electrode and comprising two arms jointed together, a pivoted connection between one of said arms and said electrode, an operating link pivoted to said arms at their joint, means yieldably urging one of said arms towards said joint, and means to adjust the length of one of said arms.

7. In a welding machine, an electrode movable towards and away from the work, a toggle adapted to operate said electrode and comprising two arms jointed together, a pivoted connection between one of said arms and said electrode, an operating link pivoted to said arms at their joint, and a spring urging one of said arms towards said joint.

8. In a welding machine, an electrode movable towards and away from the work, a toggle adapted to operate said electrode and comprising two arms, one pivoted to said electrode at one end and to an operating member at the other end, a second arm pivoted at one end to said first arm and to said operating member and being slidably mounted in a rotatable bearing, and means to adjust said second arm in said bearing to vary the length of the arm.

9. In a welding machine, an electrode movable towards and away from the work, a toggle adapted to operate said electrode and comprising two arms, one pivoted to said electrode at one end and to an operating member at the other end, a second arm pivoted at one end to said first arm and to said operating member and being slidably mounted in a rotatable bearing, and a spring disposed between said second arm and said bearing and adapted to be compressed upon movement of the toggle arms towards their straightened position.

10. In a welding machine, an electrode movable towards and away from the work, a toggle adapted to operate said electrode and comprising two arms, one pivoted to said electrode at one end and to an operating member at the other end, a second arm pivoted at one end to said first arm and to said operating member and being slidably mounted in a rotatable bearing, means to adjust said second arm in said bearing to vary the length of the arm, and a spring disposed between said second arm and said bearing and adapted to be compressed upon movement of the toggle arms towards their straightened position.

11. In a welding machine, an electrode movable towards and away from the work, a toggle adapted to operate said electrode and comprising two arms jointed together, an operating link pivoted to said arms at their joint, a rotatable cam adapted to operate said link, means to prevent rotation of said cam, means to render said preventing means inoperative, and means to rotate the cam.

12. In a welding machine, an electrode movable towards and away from the work, a toggle adapted to operate said electrode and comprising two arms jointed together, an operating link pivoted to said arms at their joint, a rotatable cam adapted to operate said link, a continually rotating shaft, and means to clutch said cam to said shaft to be rotated thereby.

13. In a welding machine, an electrode movable towards and away from the work, a toggle adapted to operate said electrode and comprising two arms jointed together, an operating link pivoted to said arms at their joint, a rotatable cam adapted to operate said link, a continually rotating shaft, means to clutch said cam to said shaft to be rotated thereby, and means normally preventing rotation of said cam but movable to permit said clutching thereof to the shaft.

14. In a welding machine, a continually rotating shaft and a normally stationary shaft, clutch elements on said shafts adapted to impart motion from the continually rotating shaft to the normally stationary shaft, a cam on said stationary shaft, a reciprocable pin normally in contact with said cam and holding said clutch elements out of engagement, means to move said pin out of engagement with the cam, a spring adapted upon movement of said pin to force said clutch elements into engagement, a toggle adapted to be operated by said normally stationary shaft upon rotation thereof, and an electrode adapted to be moved by said toggle.

EDMUND J. von HENKE.